Feb. 19, 1952

H. C. RHODES 2,586,089

DOUGH SHEETING ROLL

Filed Sept. 1, 1949

INVENTOR.
HERBERT C. RHODES
BY
Otto Maeller
Attorney

Patented Feb. 19, 1952

2,586,089

UNITED STATES PATENT OFFICE 2,586,089

DOUGH SHEETING ROLL

Herbert Cecil Rhodes, Portland, Oreg., assignor to Read Standard Corporation, a corporation of Delaware Application September 1, 1949, Serial No. 113,609

2 Claims. (Cl. 107—12)

This invention relates to dough sheeting rolls of the type having a cylindrical surface of a plastic material which has an extremely low adhesive factor for dough so that the tendency of dough to stick to the roll is rendered negligible and has for its principal object the provision of a roll of this type in which the ends of the plastic material are protected while making negligible contact of dough with any part of the roll except for the plastic material.

Another object of the invention is to provide a dough sheeting roll having a metal core provided with a sleeve of plastic material, preferably in the form of a plurality of annular sections, with metallic flanges at the ends of the core to form retaining walls for the plastic sleeve and constructed to render negligible contact of dough with metal.

It is general practice to provide one of a pair of cooperating dough sheeting rolls with metal end flanges projecting outwardly beyond the cylindrical surface of the body of the roll, between which flanges the other roll runs, and it is a further object of the invention to provide dough sheeting means of this general type wherein the cooperating rolls are each provided with a sleeve of plastic material and in which a tight fit is maintained between the projecting flanges of the one roll and the ends of the cooperating roll, the construction being such that sliding frictional contact is eliminated between the projecting flanges of the one roll and the ends of the plastic cylindrical surface of the cooperating roll and rendering negligible contact of dough with any part of the cooperating rolls except for their plastic surfaces.

Figure 1:
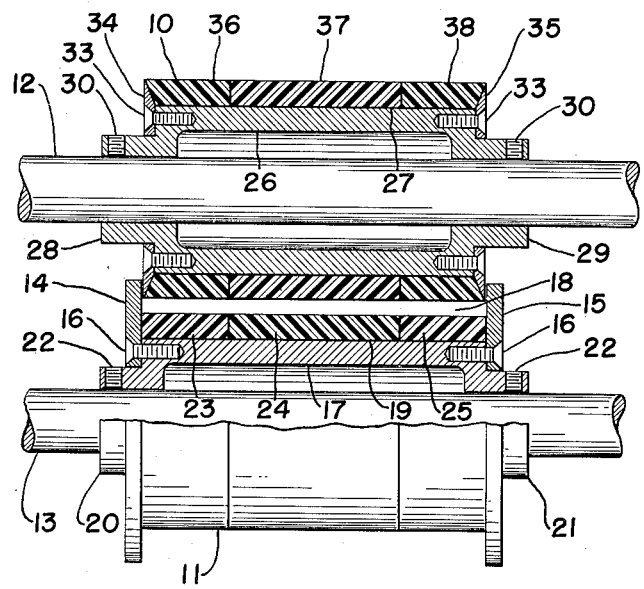
Figure 2:
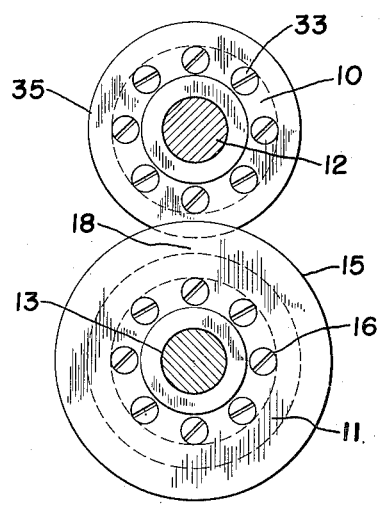

Other objects and advantages of the invention will become apparent from the following description when read in connection with the accompanying drawings, in which Figure 1 is a sectional view through a pair of cooperating sheeting rolls embodying my invention, parts being shown in elevation; and Figure 2 is an end elevation of the sheeting rolls of Figure 1, the shafts on which they are mounted being shown in section.

In Figure 1 is shown a pair of cooperating dough sheeting rolls 10 and 11 mounted for rotation with their respective shafts 12 and 13.

In accordance with general practice one of the cooperating rolls, as 11, is provided with end flanges 14 and 15 projecting beyond the cylindrical surface of the roll, one or both of which flanges is detachable and secured by a number of screws 16 to the metal, preferably cast iron, core 17 of the roll 11.

One or both of the rolls is power driven in a manner well known in the art, and the drive mechanism is therefore not shown. The cylindrical surfaces of the rolls are spaced apart to provide a clearance 18 which varies in size depending upon whether the pair of cooperating rolls forms the first, second, third or fourth pair of molding rolls. Suitable well known means, not shown, is provided for adjusting the rolls to vary the clearance therebetween.

The core 17 of roll 11 has a surface 19, preferably cylindrical between the flanges 14 and 15. Trunnions 20 and 21 are formed with the ends of the core 17 and are of lesser diameter forming an annular recess at each end of the core 17 to receive the flanges 14 and 15. Suitable means, as set screws 22, extend through the trunnions 20 and 21 and secure the roll 11 to the shaft 13.

Encompassing the cylindrical surface 19 is a plastic sleeve having an extremely low adhesive factor for dough, composed of a number of independent annular sections 23, 24 and 25. The number of sections may be increased or decreased depending on the length of the roll. The rolls are preferably formed of a number of sections in order that the space which must be provided for expansion of the plastic sleeve may be divided up into a plurality of spaces between adjoining sections sufficiently small so that dough will not creep or work its may into the spaces. The best plastic used so far is a tetrafluoroethylene resin known under the trade name "Teflon."

The roll 10 is provided with a core 26 having a preferably cylindrical surface 27, the axial length being less than the axial length of the cylindrical surface 19 of core 17 of roll 11, for a purpose later described. Trunnions 28 and 29 are formed with the ends of the core 26 and suitable means, as set screws 30, extend through the trunnions 28 and 29 for securing the roll 10 to the shaft 12. The diameter of the trunnions 28 and 29 is smaller than the diameter of the cylindrical surface 27 of core 26 and annular flanges 34 and 35 fit around the trunnions 28 and 29, respectively, and are secured to and in abutting relation with the core 26 at the ends of the cylindrical surface 27 by means of a number of screws 33.

The flanges 34 and 35 project beyond the cylindrical surface 27 of core 26 and between the projecting portions of flanges 34 and 35 is a plastic sleeve, preferably composed of a plurality of annular sections 36, 37 and 38 encompassing the cylindrical surface 27 of core 26. These sections are spaced in a manner similar to the spacing of annular plastic sections 23, 24 and 25.

A peripheral portion of the roll 10 runs between the flanges 14 and 15 of roll 11 as the rolls 10 and 11 rotate, with overlapping portions of the outer faces of flanges 34 and 35 of roll 10 and the inner faces of flanges 14 and 15 of roll 11 having a running clearance therebetween. The portion of the inner faces of flanges 34 and 35 projecting outwardly from the cylindrical surface 27 of core 26 to the cylindrical surface of the plastic annular sections 36, 37 and 38 flare outwardly to meet the outer faces of flanges 34 and 35, and the outer ends of plastic sections 36 and 38 are correspondingly flared.

It is therefore apparent that the outer surfaces of the plastic sleeves of the rollers 10 and 11 are co-extensive in length so that contact of dough with the flanges 34 and 35 is rendered negligible as the dough passes through the rolls 10 and 11 during the sheeting or moulding operation and consequently sticking or adherence of dough to the rolls is eliminated.

The tapered peripheral portion of flanges 34 and 35 provide retaining walls at the ends of the plastic sleeve of roll 10, and protect the ends of the sleeve against damage, particularly when running between the flanges 14 and 15 of roll 11.

I claim:

1. Dough sheeting means including a pair of cooperating rolls, one of said rolls having a cylindrical surface of a plastic, a flange at each end of said roll extending beyond the surface of said plastic, and a second roll having a flange at each end arranged to run between and fit closely against the flanges of said first roll, said second roll having a cylindrical sleeve of a plastic disposed between the flanges of said second roll, said last named flanges tapering toward their outer ends whereby contact with said flanges of dough passing between said rolls is rendered negligible.

2. Dough sheeting means according to claim 1 in which the flanges are metal and the cylindrical surfaces are of a plastic having a lower adhesive factor for dough than said flanges.

HERBERT CECIL RHODES.

REFERENCES CITED

The following references are of record in the file of this patent:

UNITED STATES PATENTS

| Number | Name | Date |
|---|---|---|
| 202,992 | Clark | Apr. 30, 1878 |
| 1,357,001 | Priborsky | Oct. 26, 1920 |
| 1,370,709 | Smith | Mar. 8, 1921 |
| 1,520,602 | Schmid | Dec. 23, 1924 |
| 1,794,896 | Hauck | Mar. 3, 1931 |
| 1,852,451 | Everett | Apr. 5, 1932 |
| 2,465,376 | Hooper | Mar. 29, 1949 |